Patented Aug. 23, 1932

1,873,474

UNITED STATES PATENT OFFICE

EMIL PFIFFNER, OF FRIBOURG, SWITZERLAND, ASSIGNOR, BY MESNE ASSIGNMENTS, TO RADIO PATENTS CORPORATION, OF NEW YORK, N. Y., A CORPORATION OF NEW YORK

METHOD OF PRODUCING FILMS OR THE LIKE, PARTICULARLY FOR USE IN ELECTRIC CONDENSERS

No Drawing. Application filed February 10, 1927, Serial No. 167,371, and in Germany March 22, 1926.

This invention relates to a method of producing films particularly from cellulose-derivates, cellulose-esters and cellulose-ethers, which are employed as dielectric in the manufacture of electric condensers. Such films have to be of a quite homogeneous structure, as otherwise the dielectric is punctured in case of any damaged or flawed place.

However in practice it has been found, that such deficient places in the film cannot be avoided even if the greatest care is taken during the manufacture, because all impurities cannot be removed even in the case of the most careful filtering.

According to the present invention the film is formed by two or more films, which are united to a homogeneous film before the same become stiff. By employing suitable and properly mixed solvents and swelling means for the different cellulose mixtures it is possible to produce films of any desired thickness and to regulate the time of stiffening according to requirement, so that the composite film, consisting of a number of films, may be made of the desired thickness. For effecting a proper overlapping of weak spots in one of the individual films of the homogeneous composite film it is necessary, that in the moment of union each individual film has to be of sufficient consistency in order to render impossible an exchange of the impurities contained in the individual films.

Such a film is more resistant against puncturing, because it is not very likely that electrically deficient places of the different individual films just coincide with one another.

The composite film according to the present invention is manufactured in the same way as the single films with the exception that a number of spraying arrangements are employed and that the individual films meet on a common support at such a plasticity, that they unite with one another without forming blisters and form a film of a homogeneous structure, which in the dry condition does not show any stratas.

If desired the homogeneity operation may be promoted by heat and pressure and the metal sheet, forming the conductor, may serve as support during the manufacture of the film. The convenient proportion of the solvents and swelling means is determined by a simple test.

I claim:—

The method of forming dielectric coated condenser plates which comprises forming a plurality of cellulose derivative films in a somewhat plastic condition, attaching one of said films to a condenser plate, and homogeneously uniting the films to each other with the aid of pressure while still in a plastic condition.

In testimony whereof I affix my signature.

EMIL PFIFFNER.